US009061616B2

(12) United States Patent
Kondrad et al.

(10) Patent No.: US 9,061,616 B2
(45) Date of Patent: Jun. 23, 2015

(54) ARTICULATING HEADREST ASSEMBLY (71) Applicant: Ford Global Technologies, LLC, Dearborn, MI (US)

(72) Inventors: Marc Kondrad, Macomb Township, MI (US); Johnathan Andrew Line, Northville, MI (US); Joe S. Talamonti, Canton, MI (US); John W. Jaranson, Dearborn, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 13/749,602

(22) Filed: Jan. 24, 2013

(65) Prior Publication Data

US 2014/0203611 A1 Jul. 24, 2014

(51) Int. Cl.
*B60N 2/48* (2006.01)
*B60N 2/20* (2006.01)
*B60N 2/22* (2006.01)

(52) U.S. Cl.
CPC ............... *B60N 2/4852* (2013.01); *B60N 2/22* (2013.01); *B60N 2/2222* (2013.01); *B60N 2/4838* (2013.01)

(58) Field of Classification Search
CPC .... B60N 2/4852; B60N 2/4838; B60N 2/485; B60N 2/4855; B60N 2/4847; B60N 2/2222; B60N 2/22
USPC .................................... 297/408, 410, 61, 409
See application file for complete search history.

(56) References Cited

U.S. PATENT DOCUMENTS

| 2,958,369 | A | 11/1960 | Pitts et al. |
| 3,403,938 | A | 10/1968 | Cramer et al. |
| 3,885,831 | A | 5/1975 | Rasmussen |
| 3,929,374 | A | 12/1975 | Hogan et al. |

(Continued)

FOREIGN PATENT DOCUMENTS

| DE | 10331612 A1 * | 2/2005 |
| DE | 102010024180 A1 * | 2/2011 |

(Continued)

OTHER PUBLICATIONS

Brose India Automotive Systems, "Adaptive Sensor Controlled Headrest," http://www.indiamart.com/broseindiaautomotivesystems/products.html, Oct. 9, 2012 (12 pages).

(Continued)

*Primary Examiner* — Milton Nelson, Jr.
(74) *Attorney, Agent, or Firm* — Vichit Chea; Price Heneveld LLP (57) ABSTRACT

A vehicle seating assembly includes a seatback, a headrest, and a support structure that extends between the headrest and the seatback. The support structure includes a primary member, a secondary member, and a trim piece that encloses the primary and secondary members. The primary member pivotally couples with the headrest and the seatback. The secondary member has an upper end and a lower end. The upper end pivotally couples with the headrest about a lateral axis and is spaced from the primary member. A first actuator couples between with the primary member and the seatback for rotating the headrest between a rearward position and a forward position. A second actuator couples between the lower end of the secondary member and the seatback to move the headrest between a first angle and a second angle.

19 Claims, 11 Drawing Sheets

(56) References Cited

U.S. PATENT DOCUMENTS

| | | | |
|---|---|---|---|
| 4,324,431 A | 4/1982 | Murphy et al. | |
| 4,334,709 A | 6/1982 | Akiyama et al. | |
| 4,353,595 A | 10/1982 | Kaneko et al. | |
| 4,366,985 A * | 1/1983 | Leffler | 297/409 |
| 4,541,669 A | 9/1985 | Goldner | |
| 4,629,248 A | 12/1986 | Mawbey | |
| 4,668,014 A * | 5/1987 | Boisset | 297/408 |
| 4,720,141 A | 1/1988 | Sakamoto et al. | |
| 4,840,429 A * | 6/1989 | Stockl | 297/409 |
| 4,915,447 A | 4/1990 | Shovar | |
| 5,054,856 A * | 10/1991 | Wang | 297/408 |
| 5,171,062 A | 12/1992 | Courtois | |
| 5,174,526 A | 12/1992 | Kanigowski | |
| 5,222,784 A | 6/1993 | Hamelin | |
| 5,518,294 A | 5/1996 | Ligon, Sr. et al. | |
| 5,560,681 A | 10/1996 | Dixon et al. | |
| 5,647,635 A | 7/1997 | Aumond et al. | |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A | 11/1998 | Karschin et al. | |
| 5,902,014 A | 5/1999 | Dinkel et al. | |
| 5,913,568 A | 6/1999 | Brightbill et al. | |
| 5,951,039 A | 9/1999 | Severinski et al. | |
| 6,024,406 A | 2/2000 | Charras et al. | |
| 6,062,642 A | 5/2000 | Sinnhuber et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,454,353 B1 | 9/2002 | Knaus | |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,726,280 B1 * | 4/2004 | Liao | 297/353 |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,344,189 B2 | 3/2008 | Reed et al. | |
| 7,350,859 B2 | 4/2008 | Klukowski | |
| 7,393,005 B2 | 7/2008 | Inazu et al. | |
| 7,413,253 B2 * | 8/2008 | Karlberg | 297/408 |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,597,398 B2 | 10/2009 | Lindsay | |
| 7,614,693 B2 | 11/2009 | Ito | |
| 7,640,090 B2 | 12/2009 | Uchida et al. | |
| 7,641,281 B2 | 1/2010 | Grimm | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,794,012 B2 | 9/2010 | Szablewski | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,201,883 B2 | 6/2012 | Wuerstlein et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2007/0120401 A1 | 5/2007 | Minuth et al. | |
| 2008/0174159 A1 | 7/2008 | Kojima et al. | |
| 2009/0066122 A1 | 3/2009 | Minuth et al. | |
| 2009/0322124 A1 | 12/2009 | Barkow et al. | |
| 2010/0038937 A1 | 2/2010 | Andersson et al. | |
| 2010/0140986 A1 | 6/2010 | Sawada | |
| 2010/0140992 A1 | 6/2010 | Yamaguchi | |
| 2010/0187881 A1 | 7/2010 | Fujita et al. | |
| 2010/0201167 A1 | 8/2010 | Wieclawski | |
| 2010/0231013 A1 | 9/2010 | Schlenker | |
| 2010/0270840 A1 | 10/2010 | Tanaka et al. | |
| 2010/0301650 A1 | 12/2010 | Hong | |
| 2010/0320816 A1 | 12/2010 | Michalak | |
| 2011/0018498 A1 | 1/2011 | Soar | |
| 2011/0074185 A1 | 3/2011 | Nakaya et al. | |
| 2011/0095513 A1 | 4/2011 | Tracht et al. | |
| 2011/0095578 A1 | 4/2011 | Festag | |
| 2011/0109127 A1 | 5/2011 | Park et al. | |
| 2011/0109128 A1 | 5/2011 | Axakov et al. | |
| 2011/0133525 A1 | 6/2011 | Oota | |
| 2011/0163574 A1 | 7/2011 | Tame et al. | |

(56) References Cited

U.S. PATENT DOCUMENTS

| | | |
|---|---|---|
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0041648 A1 | 2/2012 | Yamaguchi et al. |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |

FOREIGN PATENT DOCUMENTS

| | | | |
|---|---|---|---|
| EP | 0174884 B1 | * | 9/1987 |
| EP | 0754590 | | 1/1997 |
| EP | 0926969 | | 1/2002 |
| EP | 1266794 | | 3/2004 |
| EP | 1123834 | | 10/2004 |
| EP | 1050429 | | 10/2005 |
| EP | 1084901 | | 6/2006 |
| EP | 1674333 | | 8/2007 |
| EP | 1950085 | | 12/2008 |
| EP | 1329356 | | 11/2009 |
| ES | 2107995 T1 | * | 12/1997 |
| FR | 2875753 A1 | * | 3/2006 |
| GB | 1260717 A | * | 1/1972 |
| WO | WO9511818 | | 5/1995 |
| WO | WO9958022 | | 11/1999 |
| WO | WO2006131189 | | 12/2006 |
| WO | WO2007028015 | | 8/2007 |
| WO | WO2008073285 | | 6/2008 |
| WO | WO2011021952 | | 2/2011 |
| WO | WO2012008904 | | 1/2012 |

OTHER PUBLICATIONS eCoustics.com, "Cineak Motorized Articulating Headrest Preview," http://www.ecoustics.com/ah/reviews/furniture/accessories/cineak-motorized-headrest, Oct. 9, 2012 (3 pages).

M. Grujicic et al., "Seat-cushion and soft-tissue material modeling and a finite element investigation of the seating comfort for passenger-vehicle occupants," Materials and Design 30 (2009) 4273-4285.

"Thigh Support for Tall Drivers," http://cars.about.com/od/infiniti/ig/2009-Infiniti-G37-Coupe-pics/2008-G37-cpe-thigh-support.htm (1 page), Dated Apr. 10, 2013.

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

* cited by examiner

ARTICULATING HEADREST ASSEMBLY

FIELD OF THE INVENTION

The present invention generally relates to a vehicle headrest, and more particularly to a vehicle seating assembly having an articulating headrest assembly.

BACKGROUND OF THE INVENTION

It is common for seating assemblies in vehicles to include a headrest assembly for supporting the head of a seated occupant. In some instances, these headrest assemblies may be linearly adjusted upward and downward relative to the seatback, such that these headrest assemblies lack adequate adjustment features for different sized occupants and various positions a seated occupant may assume in the seating assembly.

SUMMARY OF THE INVENTION

According to one aspect of the present invention, a vehicle seating assembly includes a seatback, a headrest, and a support structure that extends between the headrest and the seatback. The support structure includes a primary member, a secondary member, and a trim piece that encloses the primary and secondary members. The primary member pivotally couples with the headrest and the seatback. The secondary member has an upper end and a lower end. The upper end pivotally couples with the headrest about a lateral axis that is spaced from the primary member. A first actuator couples between with the primary member and the seatback for rotating the headrest between a rearward position and a forward position. A second actuator couples between the lower end of the secondary member and the seatback to move the headrest between a first angle and a second angle.

According to another aspect of the present invention, a vehicle headrest assembly includes a primary member coupled between a headrest and a seatback. A first motor operably couples with the primary member to rotate the primary member forward and adjust the headrest position. A secondary member couples with the headrest about an axis that is spaced from the primary member. A second motor operably couples with the secondary member to linearly actuate the secondary member and adjust the headrest angle.

According to yet another aspect of the present invention, a vehicle headrest assembly includes a headrest and an upper seatback that has first and second actuators. A primary member pivotally couples between the headrest and the first actuator, and moves to adjust a position of the headrest. A secondary member pivotally couples between the headrest and the second actuator, and moves to adjust an angle of the headrest.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figures 1, 2:
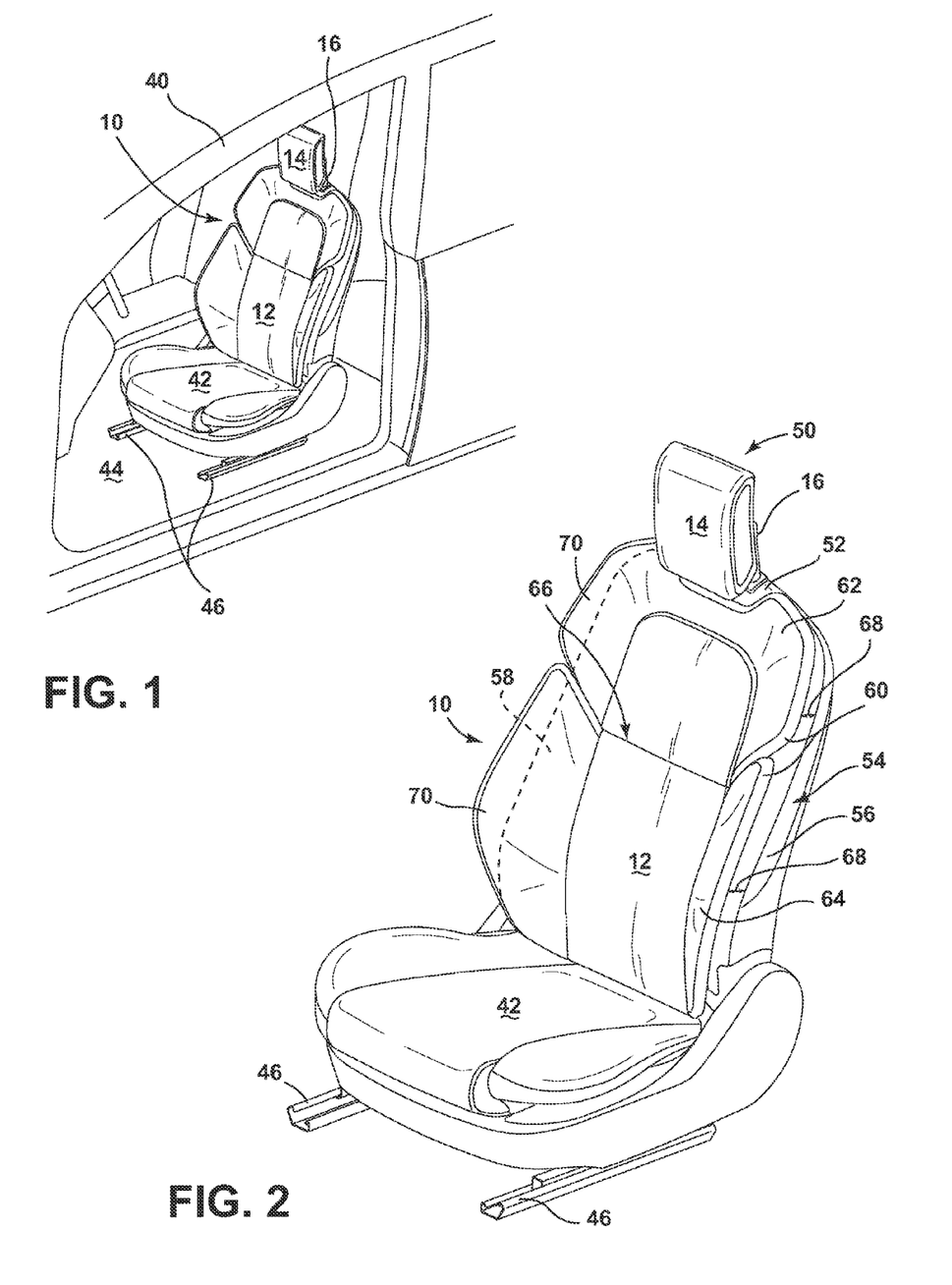
FIG. 1 is a top perspective view of vehicle seating assembly in a vehicle.
FIG. 2 is a top perspective view of the vehicle seating assembly having a headrest assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-12B, reference numeral 10 generally designates a vehicle seating assembly that includes a seatback 12, a headrest 14, and a support structure 16 that extends between the headrest 14 and the seatback 12. The support structure 16 includes a primary member 18, a secondary member 20, and a trim piece 22 that encloses the primary and secondary members 18, 20. The primary member 18 pivotally couples with the headrest 14 and the seatback 12. The secondary member 20 has an upper end 24 and a lower end 26. The upper end 24 pivotally couples with the headrest 14 about a lateral axis 154 that is spaced from the primary member 18. A first actuator 30 couples between with the primary member 18 and the seatback 12 for rotating the headrest 14 between a rearward position 32 and a forward position 34. A second actuator 35 couples between the lower end 26 of the secondary member 20 and the seatback 12 to move the headrest 14 between a first angle 36 and a second angle 38.

Referring now to FIG. 1, the vehicle seating assembly 10 is positioned in a driver side location of a vehicle 40. The vehicle seating assembly 10 includes the seatback 12 pivotally coupled with a seat 42. The seat 42 is slidably coupled with a floor 44 of the vehicle about a track assembly 46. The track assembly 46 is configured to allow the seating assembly 10 to be adjusted in forward and rearward directions relative to the vehicle 40. It is understood that the vehicle seating assembly 10 may be positioned in various locations throughout the vehicle 40 other that the illustrated position, such as a passenger side location, a mid-row location, and a rear seat location. It is also conceivable that the seat 42 may not include the track assembly 46 and alternatively may be fixedly coupled with the floor 44 of the vehicle 40.

As illustrated in FIG. 2, the seatback 12 includes a headrest assembly 50 coupled with a top support 52 of a seatback structure 54 of the seatback 12. The seatback structure 54 also includes a first side support 56 and a second side support 58 pivotally coupled with the rear portion of the seat 42. The first and second side supports 56, 58 extend upward and away from the seat 42 to couple with the top support 52, extending generally orthogonally between the side supports 56, 58. A passenger support 60 is coupled with and extends forward from the seatback structure 54 to support a back of an occupant. The passenger support 60 includes an upper back support 62 and a lower back support 64, respectively located above and below an intermediate portion 66 of the seatback. The passenger support 60 extends forward from the seatback structure 54 to define an external peripheral gap 68 between the passenger support 60 and the seatback structure 54. Accordingly, the passenger support 60 is flexible under the weight of an occupant, whereby an edge portion 70 of the passenger support 60 is flexible rearward into the external peripheral gap 68.

Figure 3:
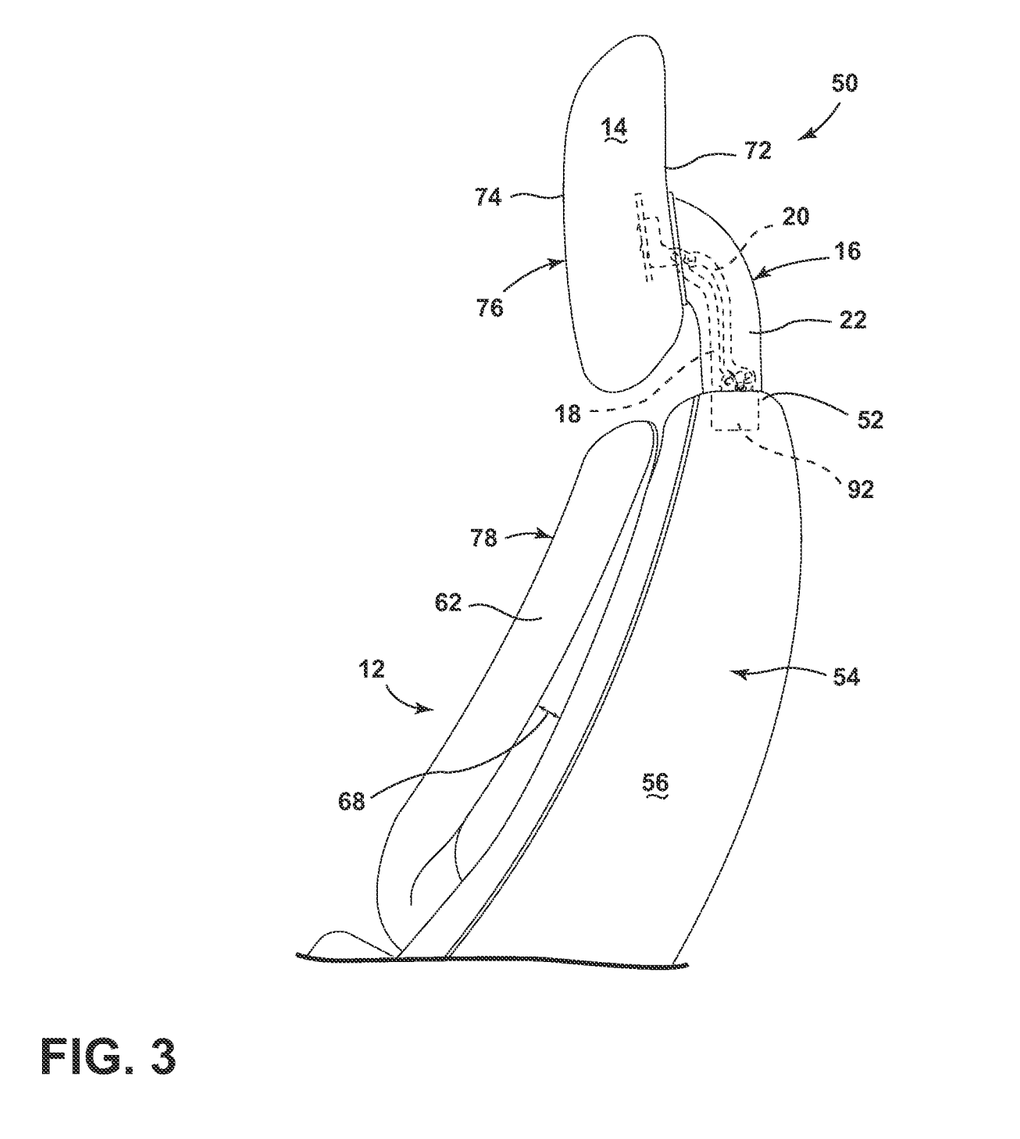
FIG. 3 is a side elevational view of the headrest assembly and a portion of a seatback of the vehicle seating assembly.

As illustrated in FIG. 3, the support structure 16 of the headrest assembly 50 extends upward from the top support 52 of the seatback structure 54 and curves forward to couple with a rear surface 72 of the headrest 14. Opposite the rear surface 72 of the headrest 14, a front surface 74 of the headrest 14 defines a head support surface 76 of the headrest 14. The upper back support 62, similarly, includes a back support surface 78 facing forward in general alignment with the head support surface 76 to support a passenger's upper back. As shown, the support structure 16 includes the trim piece 22 that substantially encloses the primary and secondary members 18, 20 of the support structure 16. The trim piece 22 extends from the rear surface 72 of the headrest 14 to the seatback structure 54. It is conceivable that the support structure 16 may be configured without the trim piece 22 and may also alternatively be arranged between the seatback 12 and the headrest 14.

Figure 4:
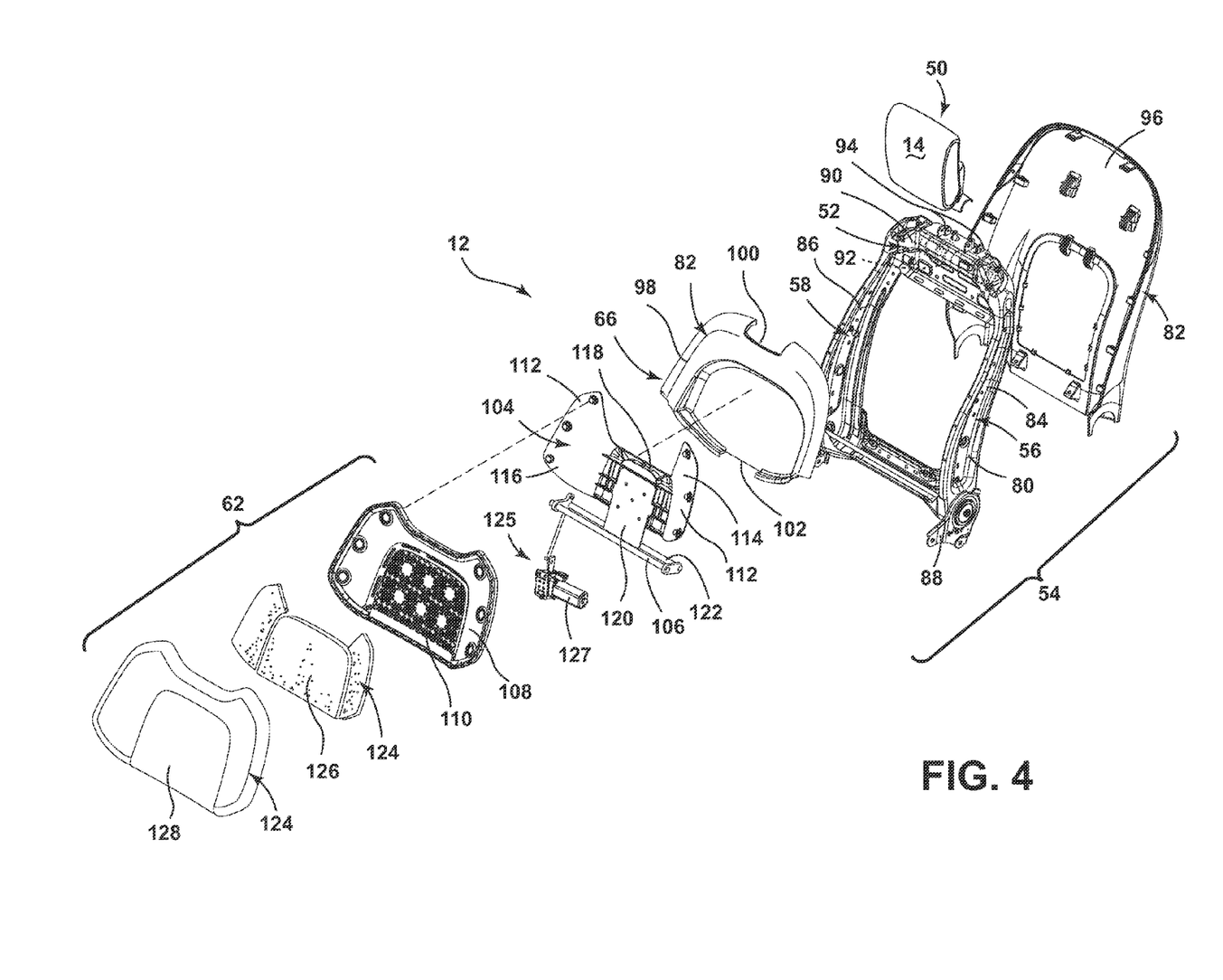
FIG. 4 is an exploded front, top perspective view of the seatback and the headrest assembly.

Referring now to FIG. 4, the seatback structure 54 includes a metal frame 80 and a plastic trim shroud 82 configured to substantially enclose the metal frame 80. The metal frame 80 has a first side member 84 and a second side member 86 extending upward from a pivotal connection with recliner brackets 88 that couple with the seat 42 (FIG. 2). The first and second side members 84, 86 are substantially parallel with each other and curve upward and rearward from the recliner brackets 88 to provide a curved shape that is substantially similar to a passenger's spinal column. Further, the side members 84, 86 are more robust proximate the recliner brackets 88 and taper as they extend upward to couple with a top member 90 that extends generally orthogonally between the first and second side members 84, 86. Accordingly, the first and second side supports 56, 58 of the seatback structure 54 include the first and second side members 84, 86, respectively, and the top support 52 of the seatback structure 54 includes the top member 90 of the metal frame 80. The top member 90 of the metal frame 80 is configured to house a motorized actuation assembly 92 of the headrest assembly 50. Also, the top member 90 includes connection features 94 protruding upward to couple with the support structure 16 of the headrest assembly 50. The connection features 94 are configured to align the headrest assembly 50 centrally between the first side member 84 and the second side member 86 of the seatback structure 54. It is conceivable that the connection features 94 may be alternatively constructed to pivotally couple with the headrest assembly 50.

As also shown in FIG. 4, the trim shroud 82 that substantially encloses the metal frame 80 includes a rear trim panel 96 and a front trim panel 98. The rear trim panel 96 couples between the first and second side members 84, 86 of the metal frame 80 to substantially enclose the rear portion of the seatback structure 54. The front trim panel 98 couples with the top member 90 and the side members 84, 86 of the metal frame 80 to enclose an upper, front portion of the seatback structure 54. The front trim panel 98 includes a mounting cutaway 100 proximate the connection features 94 on the metal frame 80 for receiving the support structure 16 of the headrest assembly 50 that extends through the mounting cutaway 100 to pivotally couple with the connection feature 94 of the seatback structure 54 and the motorized actuation assembly 92. The front trim panel 98 also includes a lower cutaway 102 proximate the intermediate portion 66 of the seatback 12 for receiving a suspension component 104 of the upper back support 62. The suspension component 104 extends through the lower cutaway 102 to couple with a pivot bar 106 that extends laterally between the first and second side supports 56, 58 of the seatback structure 54. The trim shroud 82 is molded with a polymer material and the metal frame 80 is constructed of a rigid metal, such as steel, aluminum, or other substantially rigid metals. However, it is conceivable that alternative materials or forming methods may be used for the trim shroud 82 and the metal frame 80. In addition, the trim shroud 82 or portions thereof may conceivably be integrated with the metal frame 80 or portions thereof to form the seatback structure 54.

Still referring to FIG. 4, the upper back support 62 of the passenger support 60 includes a trim carrier 108 that removably couples with the suspension component 104. The trim carrier 108 has an open matrix 110 that defines a pattern of resilient elements configured to support the weight of a passenger. The suspension component 104, as shown in the illustrated embodiment, includes outwardly extending flex members 112 that operably couple to the upper back support 62. More specifically, the suspension component 104 has a first flex member 114, a second flex member 116, and a central body 118 extending there between. The trim carrier 108 couples with distal ends of the first and second flex members 114, 116. The central body 118 couples with an extension bracket 120 extending down from the suspension component 104 to couple with a support bar 122. The support bar 122 extends rearward from the pivot bar 106 and couples with the pivot bar 106 to provide a pivot axis for the upper back support 62 to pivot forward and away from the seatback structure 54. An upper back cushion 124 is disposed over the trim carrier 108. The upper back cushion 124 includes a flexible portion 126 covered with a cover stock material 128. The flexible portion 126 may conceivably include a resilient structure of woven fibers that has open areas to allow ventilation, an open cell foam, a closed cell foam, or other conceivable flexible and breathable materials. The cover stock material 128 provides additional support to hold the flexible portion 126 against the trim carrier 108 of the upper back support 62. The cover stock material 128 may conceivably include a fabric material, a leather material, a vinyl material, or other conceivable seating upholstery materials. The upper back support 62 may be pivoted forward about the pivot bar 106 using an actuation device 125, which includes a motorized actuator 127. It is conceivable that the actuation device 125 may also include a linkage arrangement, a manually rotatable mechanism, or another conceivable actuation device and/or combinations thereof.

Figure 5:
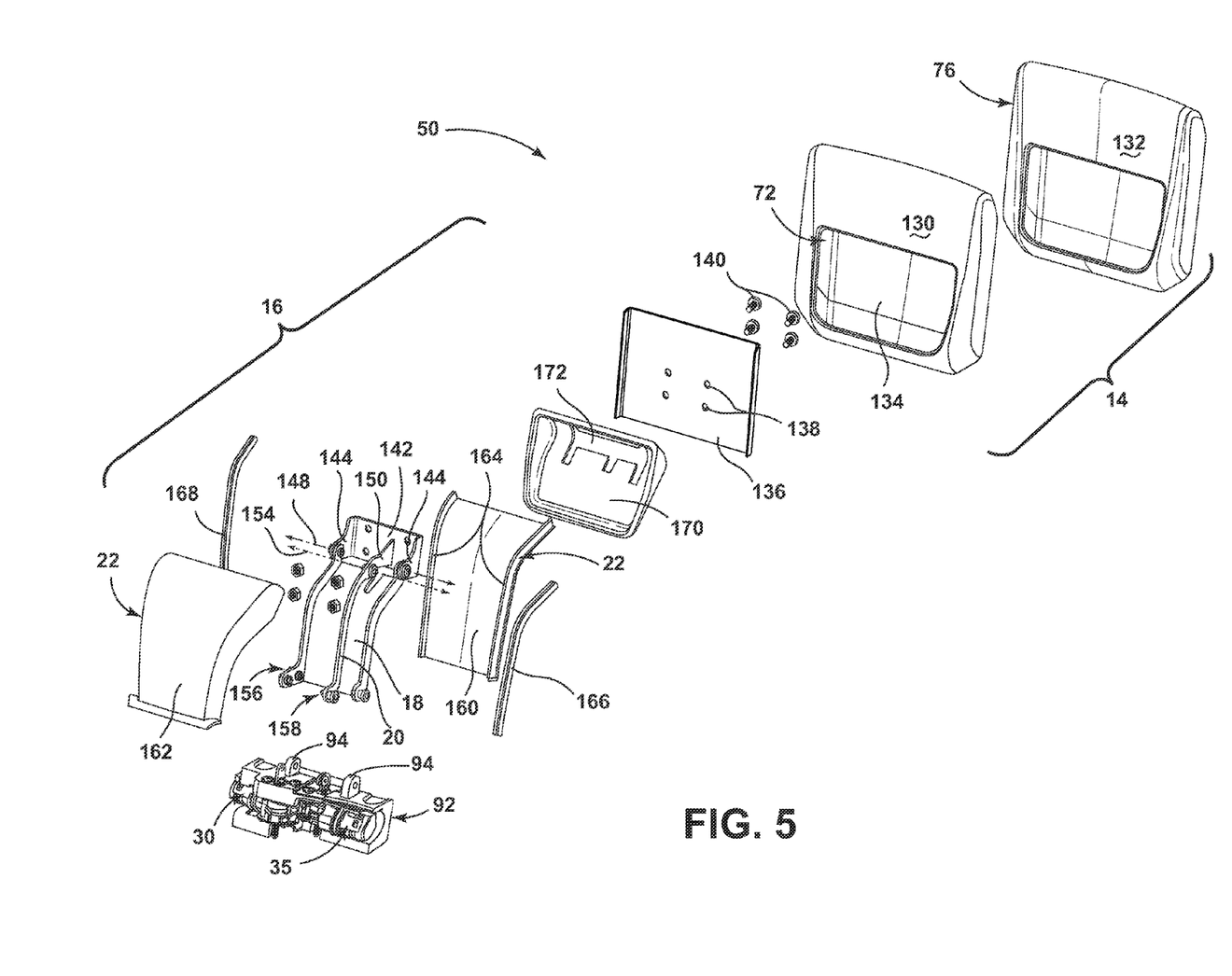
FIG. 5 is an exploded rear, top perspective view of the headrest assembly.

As illustrated in FIG. 5, the headrest assembly 50 in the illustrated embodiment includes the headrest 14 having a headrest cushion 130 substantially enclosed with a cover stock 132. The headrest cushion 130 includes a recessed area 134 on the rear surface 72 of the headrest 14. The recessed area 134 receives a mounting plate 136 that couples with the headrest 14 and provides a rigid support to couple with the support structure 16. It is contemplated that the headrest cushion 130 may conceivably include a resilient structure of woven fabrics, an open cell foam, a closed cell foam, or other conceivable flexible and breathable materials, which may be similar to the flexible portion 126 of the upper back cushion 124 (FIG. 4). Further, the cover stock 132 is disposed over the headrest cushion 130 to define the head support surface 76 of the headrest 14. The cover stock 132 may conceivably include a fabric material, a leather material, a vinyl material, or other conceivable upholstery materials, which may be similar to the cover stock material 128 of the upper back cushion 124 (FIG. 4).

The mounting plate 136, as shown in FIG. 5, includes attachment apertures 138 to receive a plurality of fasteners 140 for coupling the mounting plate 136 with a support bracket 142 on the support structure 16 of the headrest assembly 50. In addition, the support bracket 142 pivotally couples with the primary member 18 and the secondary member 20 of the support structure 16. The support bracket 142 includes a pair of side flanges 144 that protrude rearwardly from the exterior lateral edges of the support bracket 142. The side flanges 144 each couple with an upper end 146 of the primary member 18 about a first lateral axis 148. A central flange 150 also protrudes rearwardly from the support bracket 142 between the side flanges 144 to couple with a top end 152 of the secondary member 20 about a second lateral axis 154. A lower end 156 of the primary member 18 and a bottom end 158 of the secondary member 20 pivotally couple with the motorized actuation assembly 92, as described in more detail below.

Still referring to FIG. 5, the trim piece 22 enclosing the primary and secondary members 18, 20 has a front portion 160 and a rear portion 162 that detachably couple along a vertical seam 164 that extends along the lateral sides of the support structure 16. A first seam element 166 and a second seam element 168 are disposed between the front and rear portions 160, 162 of the trim piece 22 along the vertical seams 164 on each lateral side of the trim piece 22. The first and second seam elements 166, 168 assist in coupling the front and rear portions 160, 162 of the trim piece 22, as well as to resist friction and squeaking between the front and rear portions 160, 162 upon movement of the headrest assembly 50. A top cover 170 is also provided between the trim piece 22 and the mounting plate 136 to substantially enclose the upper end of the support structure 16. The top cover 170 is shaped to overlap the upper end of the front and rear portions 16, 162, thereby allowing the top cover 170 to maintain the substantial enclosure upon movement of the headrest 14. Also, the top cover 170 includes a central passage 172 to allow the side flanges 144 and central flange 150 of the support bracket 142 to extend through the top cover 170 to couple with the primary and secondary members 18, 20. It is conceived that the trim piece 22 and components thereof may be alternatively shaped and further separated or integrated and to substantially enclose the primary and second members 18, 20.

Figure 6:
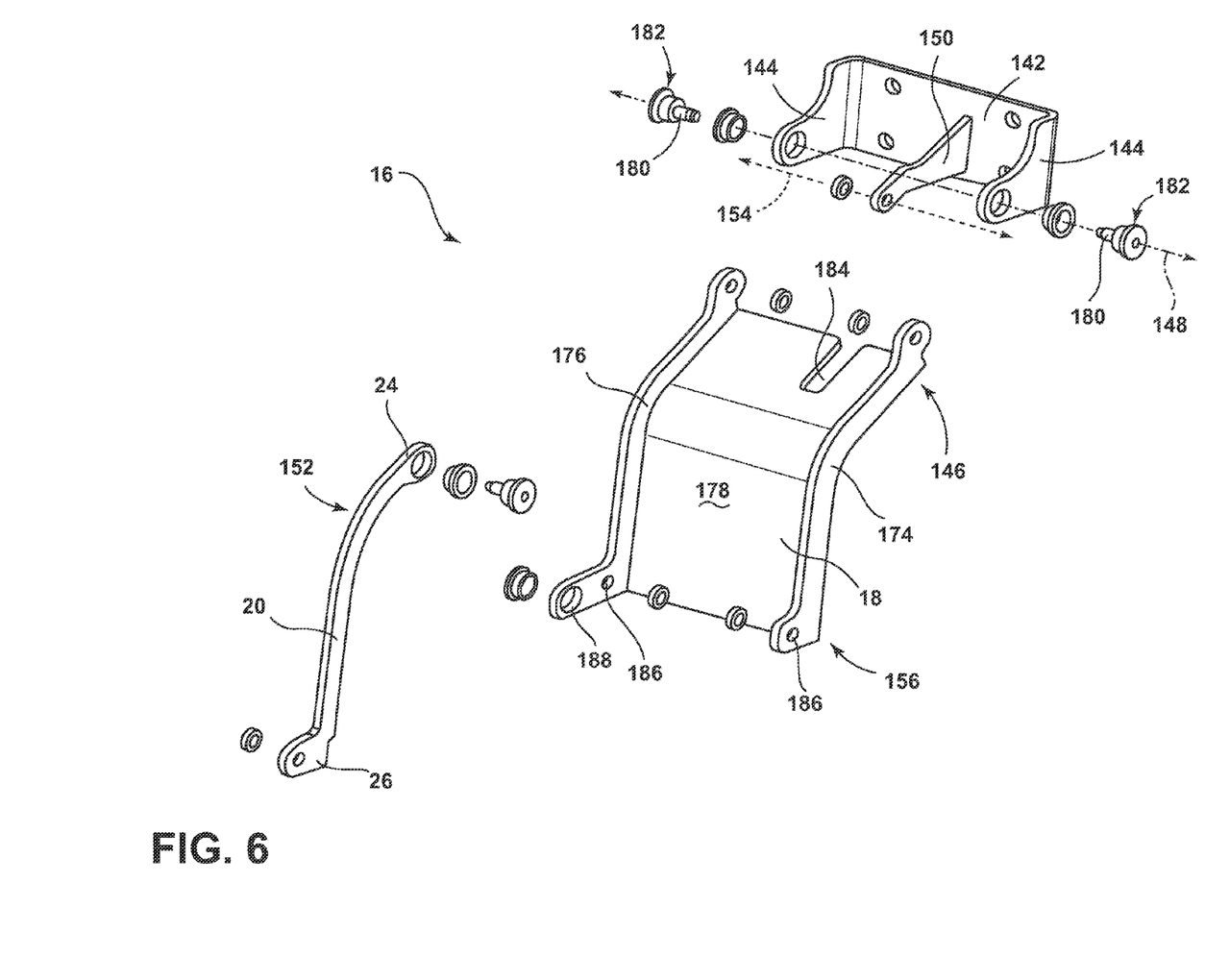
FIG. 6 is an exploded rear, top perspective view of a support structure of the headrest assembly.

As shown in FIG. 6, the primary member 18 of the support structure 16 includes a first edge portion 174 and a second edge portion 176 with a central body 178 extending therebetween. The first and second edge portions 174, 176 align with the side flanges 144 of the support bracket 142 to pivotally couple therewith about a pin portion 180 of upper pivot fasteners 182. The pivotal connection between the side flanges 144 and the first and second edge portions 174, 176 define the first lateral axis 148. Also, the first and second edge portions 174, 176 have a curved shape, bending slightly forward as the primary member 18 extends upward from the motorized actuation assembly 92 (FIG. 5). The central body 178 orthogonally extends between the first and second edge portions 174, 176 to define a plate-like structure that aligns with the curved shape of the first and second edge portions 174, 176. The upper end 146 of the primary member 18 includes a notch 184 in the central body 178 extending down in parallel alignment with the edge portions 174, 176 to receive the central flange 150 of the support bracket 142. The notch 184 also provides an area for the top end 152 of the secondary member 20 to reside upon actuation and movement of the headrest assembly 50. The top end 152 of the secondary member 20 pivotally couples with the central flange 150 of the support bracket 142 about the second lateral axis 154. The second lateral axis 154 is spaced down and rearward from the first lateral axis 148, such that movement of the second lateral axis 154 about the first lateral axis 148 causes the angle of the support bracket 142 to adjust relative to the primary and secondary members 18, 20. It is contemplated that the first and second lateral axis 148, 154 may be alternatively spaced to allow for angle adjustment of the support bracket 142.

The lower end 156 of the primary member 18, as illustrated in FIG. 6, includes pivot holes 186 on the first edge portion 174 and the second edge portion 176 to pivotally couple with the connecting features 94 (FIG. 5). Also, the lower end 156 of the primary member 18 has a cam portion 188 protruding rearward from the second edge portion 176. The cam portion 188 pivotally couples with the first actuator 30 of the motorized action assembly 92 (FIG. 5). Accordingly, the first actuator 30 moves the cam portion 188 up and down about the pivotal connection between the pivot holes 186 and the connection features 94 to rotate the position of the primary member 18 and the headrest 14 forward and rearward about the pivot holes 186. The secondary member 20 extends rearward and adjacent to the central body 178 to pivotally couple exclusively with the second actuator 35 of the motorized actuation assembly 92 (FIG. 5).

Figure 7:
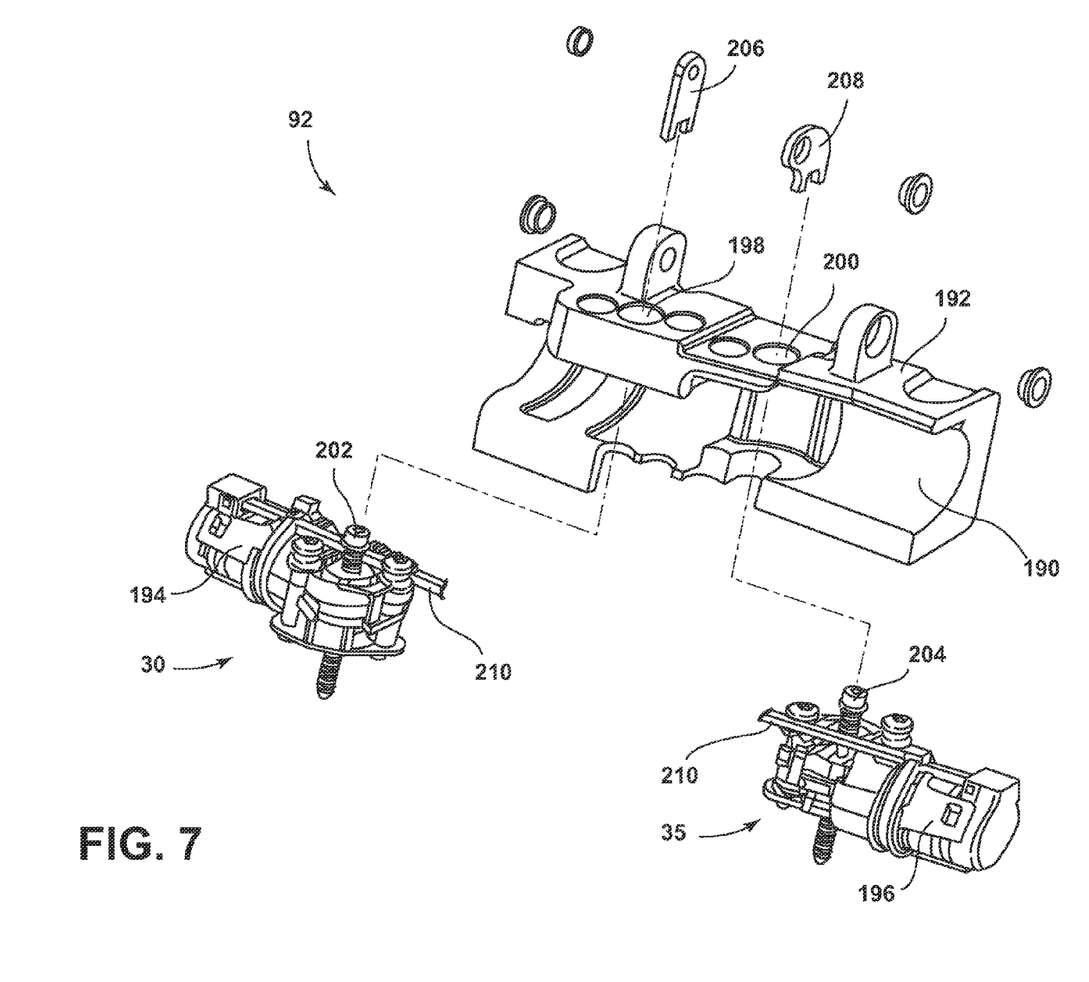
FIG. 7 is an exploded rear, top perspective view of a motorized actuation assembly.

The motorized actuation assembly 92, as shown in FIG. 7, includes the first and second actuators 30, 35 that engage a mounting cavity 190 of an actuator housing 192. The actuator housing 192 couples with the top member 90 of the seat back metal frame 80 (FIG. 4) and may conceivably be integrated with the top member 90 of the metal frame 80. The first and second actuators 30, 35 are laterally opposed in the actuator housing 192, having a first motor 194 and a second motor 196 respectively on the laterally exterior portions of the mounting cavity 190. An upper region of the mounting cavity 190 includes a first and second opening 198, 200 extending upward respectively, to allow a first linear drive 202 of the first actuator 30 and a second linear drive 204 of the second actuator 35 to couple with the support structure 16. More specifically, the first linear drive 202 and the second linear drive 204 couple respectively with a primary drive extension 206 and a secondary drive extension 208. The primary drive extension 206 pivotally couples with the cam portion 188 of the primary member 18 (FIG. 6), and the secondary drive extension 208 pivotally couples with the bottom end 158 of the secondary member 20 (FIG. 6). The first and second linear drives 202, 204 interface with a drive shaft of the respective first and second motors 194, 196. Accordingly, the first and second motors 194, 196 rotate the drive shafts therein to linearly translate the first and second linear drives 202, 204, respectively. The first and second actuators 30, 35 are electrically connected to a vehicle power source via an electrical cable 210. However, it is conceivable that the first and second actuators 30, 35 may alternatively linearly translate the linear drives 202, 204, such as by an alternatively positioned motor, a manually actuatable mechanism, a linkage or gearing arrangement, or other conceivable actuating assemblies within the seating assembly.

Figure 8:
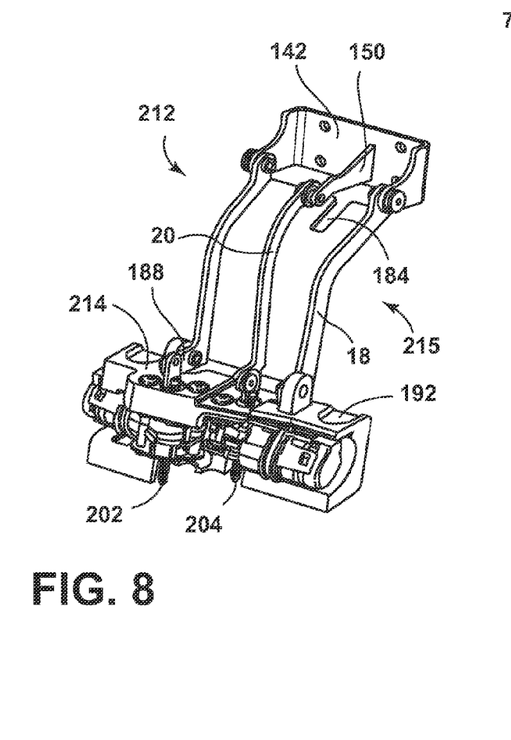
FIG. 8 is a rear, top perspective view of the support structure and the motorized actuation assembly.
Figures 8A, 8B:
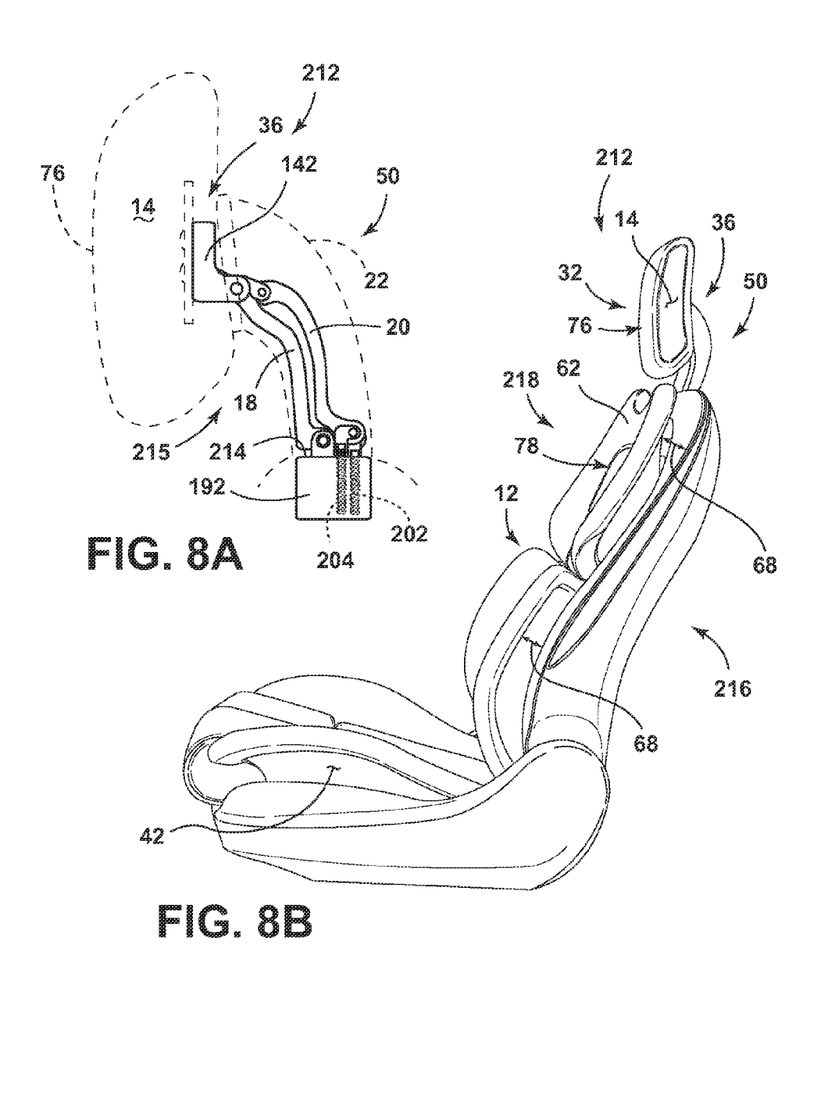
FIG. 8A is a side elevational view of the headrest assembly, as shown in FIG. 8, having a headrest and a trim piece shown in dashed lines with the headrest in a vertical position.
FIG. 8B is a side elevational view of the vehicle seating assembly, having a seatback in an upright position and the headrest in the vertical position

Referring now to FIGS. 8-8B, the headrest assembly 50 is oriented in a vertical position 212, which aligns the support bracket 142 at the first angle 36 in a similarly vertical orientation. At the first angle 36, the central flange 150 of the support bracket 142 is positioned above the notch 184 in the primary member 18, such that the secondary member 20 is suspended rearward and above the primary member 18. Also in the vertical position 212, the cam portion 188 of the primary member 18 is in substantially parallel alignment with a top surface 214 of the actuator housing 192, causing the primary member 18 to maintain a raised position 215 and hold up the headrest 14 in the rearward position 32, as illustrated. Accordingly the headrest 14 is held in the rearward position 32 at the first angle 36 when the headrest assembly 50 is in the vertical position 22. In addition, the headrest assembly 50 is in the vertical position 212 on the seatback 12 in an upright position 216, as shown in FIG. 8B. Also, the upper back support 62 is shown in a rear position 218 on the seatback 12. In the illustrated position, the headrest 14 aligns the head support surface 76 with the back support surface 78 of the upper back support 62.

Figure 9:
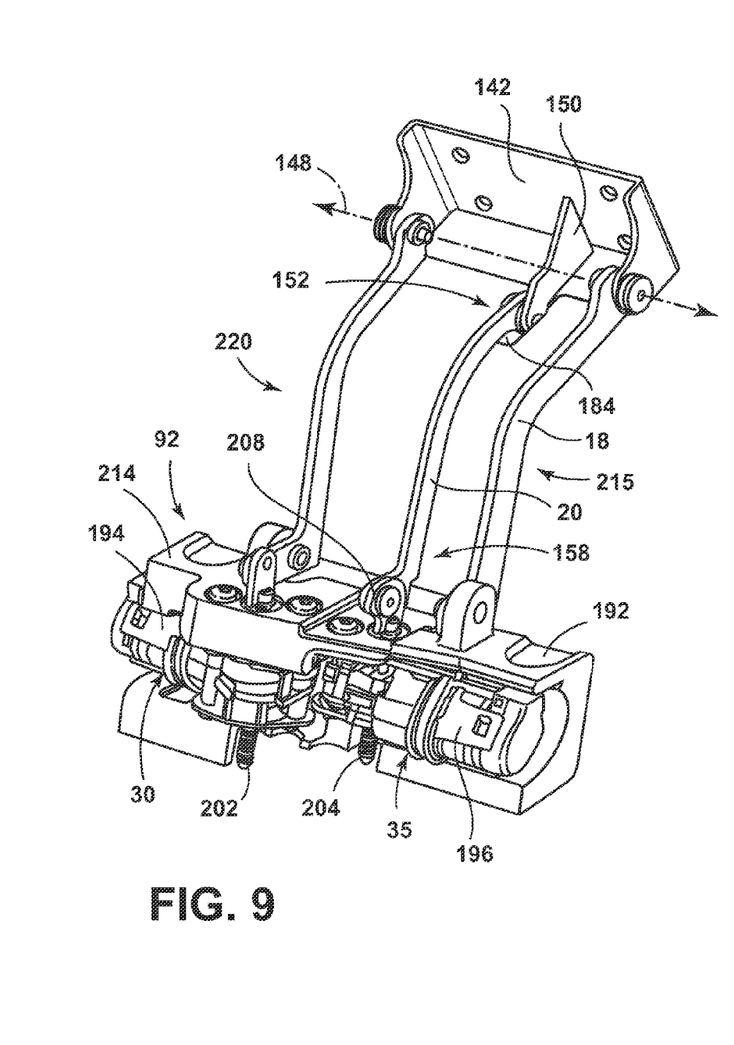
FIG. 9 is a rear, top perspective view of the support structure and the motorized actuation assembly, having a secondary member of the support structure linearly translated down by a second actuator of the motorized actuation assembly.
Figure 9A:
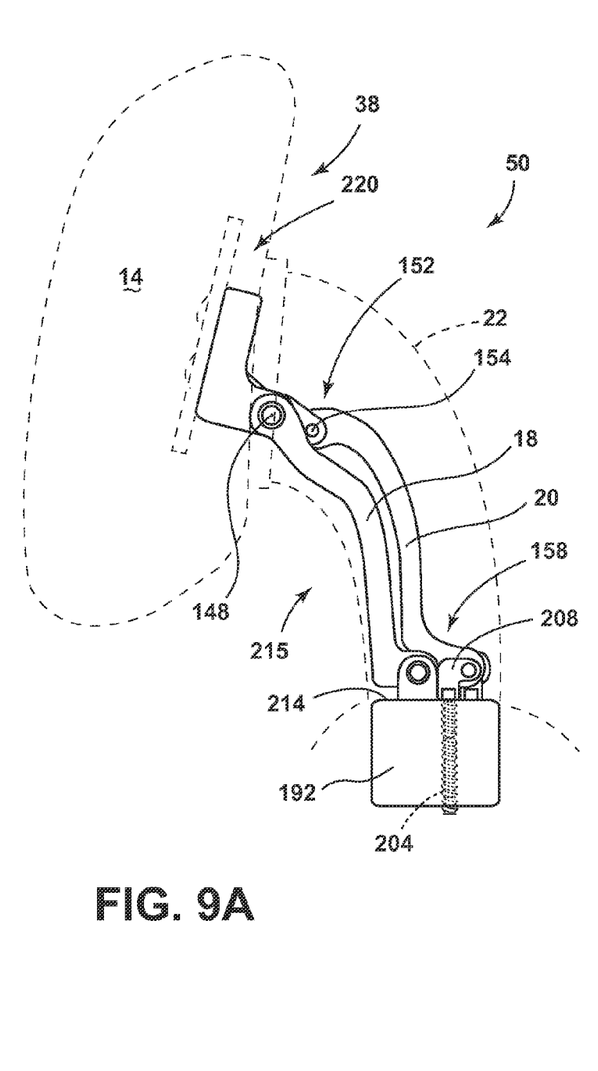
FIG. 9A is a side elevational view of the headrest assembly, as shown in FIG. 9, having the headrest and the trim piece shown in dashed lines with the headrest positioned at an upward angle.

To adjust the angle of the headrest 14, as illustrated in FIGS. 9-9A, the second actuator 35 of the motorized actuation assembly 92 operates to linearly translate the bottom end 158 of the secondary member 20 to move the central flange 150 of the support bracket 142. More specifically, the headrest 14 is positioned at the second angle 38 in an upward tilt orientation 220. To move headrest to this upward tilt orientation 220, the second motor 196 of the second actuator 35 translates the second linear drive 204 downward relative to the second motor 196 causing the secondary drive extension 208 to draw the bottom end 158 of the secondary member 20 down relative to the top surface 214 of the actuator housing 192. Accordingly, the top end 152 of the secondary member 20 pulls the central flange 150 down and rearward to rotate the support bracket 142 about the first lateral axis 148 to the second angle 38. As shown, moving the headrest 14 to the upward tilt orientation 220 also causes the central flange 150 and the top end 152 of the secondary member 20 to travel into the notch 184 on the primary member 18. To allow the support bracket 142 to rotate about the first lateral axis 148, the first motor 194 secures the primary member 18 in the raised position 215 by preventing the first linear drive 202 from moving relative to the actuator housing 192.

Figure 10:
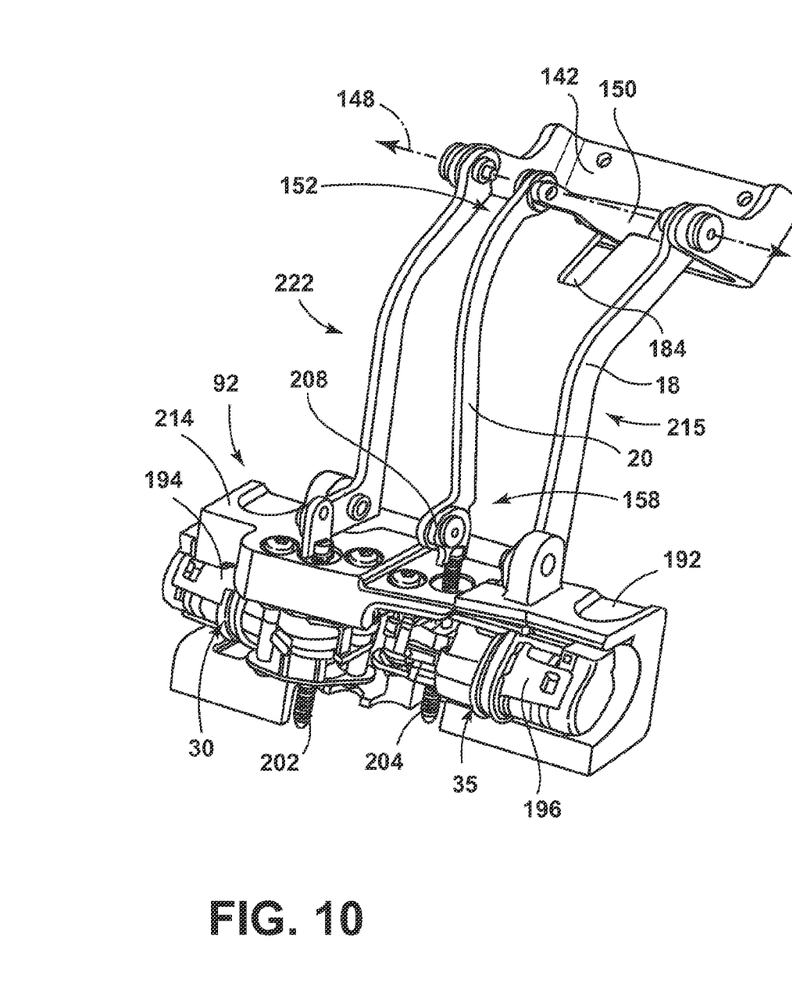
FIG. 10 is a is a rear, top perspective view of the support structure and the motorized actuation assembly, having the secondary member linearly translated upward by the second actuator.
Figure 10A:
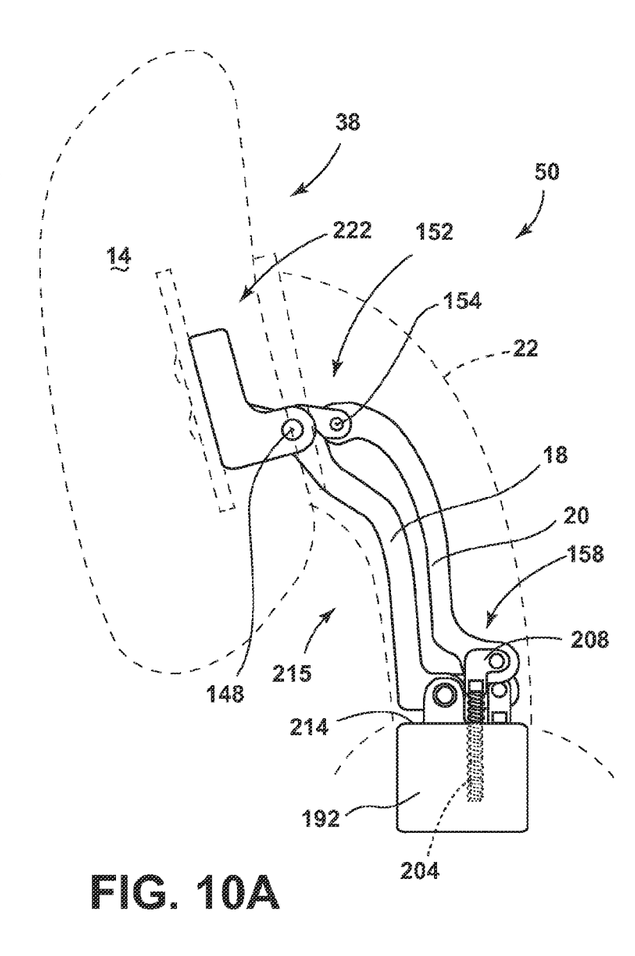
FIG. 10A is a side elevational view of the headrest assembly, as shown in FIG. 10, having the headrest and the trim piece shown in dashed lines with the headrest positioned at a downward angle.

Similarly, as illustrated in FIGS. 10-10A, the headrest 14 may be positioned at the second angle 38 in a downward tilt orientation 222. To move the headrest 14 to this downward tilt orientation 222, the second motor 196 of the second actuator 35 translates the second linear drive 204 upward relative to the actuator housing 192. This upward translation causes the secondary drive extension 208 to push the secondary member 20 upward and rotate the central flange 150 upward and forward about the first lateral axis 148. Again, the first motor 194 secures the position of the primary member 18 to allow the support bracket 142 to rotate about the first lateral axis 148. It is contemplated that the first lateral axis 148 and the second lateral axis 154 may be alternatively spaced to cause the movement of the second actuator 35 to result in the support bracket 142 to rotate in an opposite direction, such that upward movement of the second linear drive 204 would result in the headrest 14 moving to the upward tilt orientation 220. It is also conceivable that the headrest 14 may be adjusted between the first and second angles 36, 38 having alternative orientations from those illustrated herein.

Figures 11, 11A, 11B:
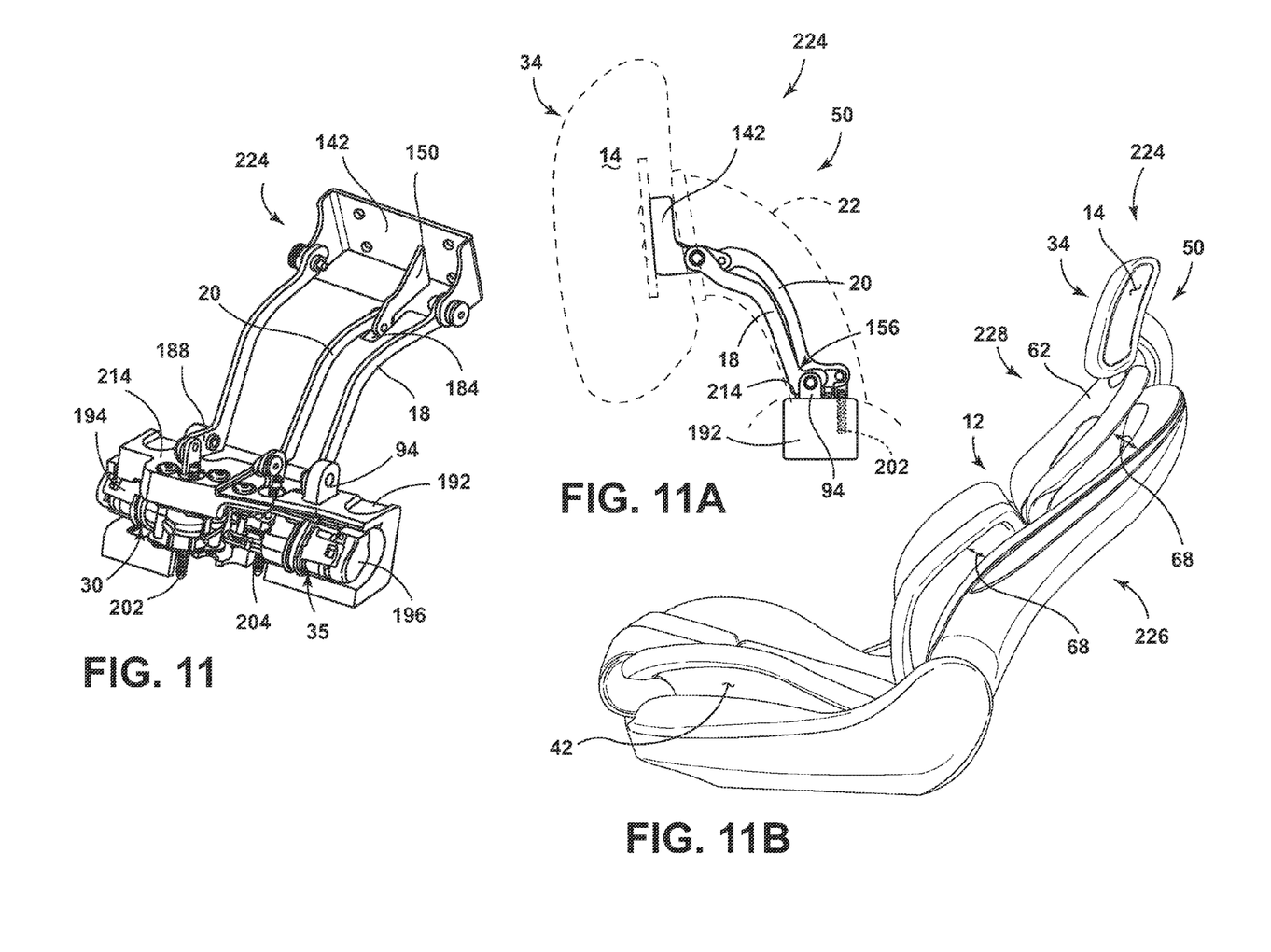
FIG. 11 is a is a rear, top perspective view of the support structure and the motorized actuation assembly, having a primary member of the support structure linearly translated upward by a first actuator of the motorized actuation assembly.
FIG. 11A is a side elevational view of the headrest assembly, as shown in FIG. 11, having the headrest and the trim piece shown in dashed lines with the headrest positioned at a first forward position.
FIG. 11B is a side elevational view of the vehicle seating assembly, having the seatback in the first reclined position and the headrest in the first forward position and at an upward angle.

Referring now to FIGS. 11-11B, the headrest 14 is oriented in the forward position 34. To move the headrest assembly 50 from the vertical position 212 (FIG. 8A) to a first forward position 224, as shown, the first motor 194 of the first actuator 30 translates the first linear drive 202 upward to pivot the primary member 18 forward. Upward translation of the first linear drive 202 causes the cam portion 188 of the primary member 18 to rotate upward and away from the top surface 214 of the actuator housing 192 about the pivotal connection of the lower end 156 of the primary member 18 with the connection features 94 on the actuator housing 192. As the first actuator 30 pivots the primary member 18 forward, the secondary member 20 is adjusted with the second actuator 35 to adjust the headrest 14 angle, as described above. The first and second actuators 30, 35 adjust the position and angle of the headrest 14 simultaneously to move the headrest 14 forward. As shown in FIG. 11B, the headrest assembly 50 is moved to the first forward position 224 in conjunction with the seatback 12 pivoting about the seat 42 to a first reclined position 226. Also, the headrest 14 is moved to the first forward position 224 to coincide with the upper back support 62 pivoting forward about the pivot bar 106 (FIG. 4) to a first deployed position 228. The first deployed position 228 expands the external peripheral gap 68 proximate the upper back support 62.

Figures 12, 12A, 12B:
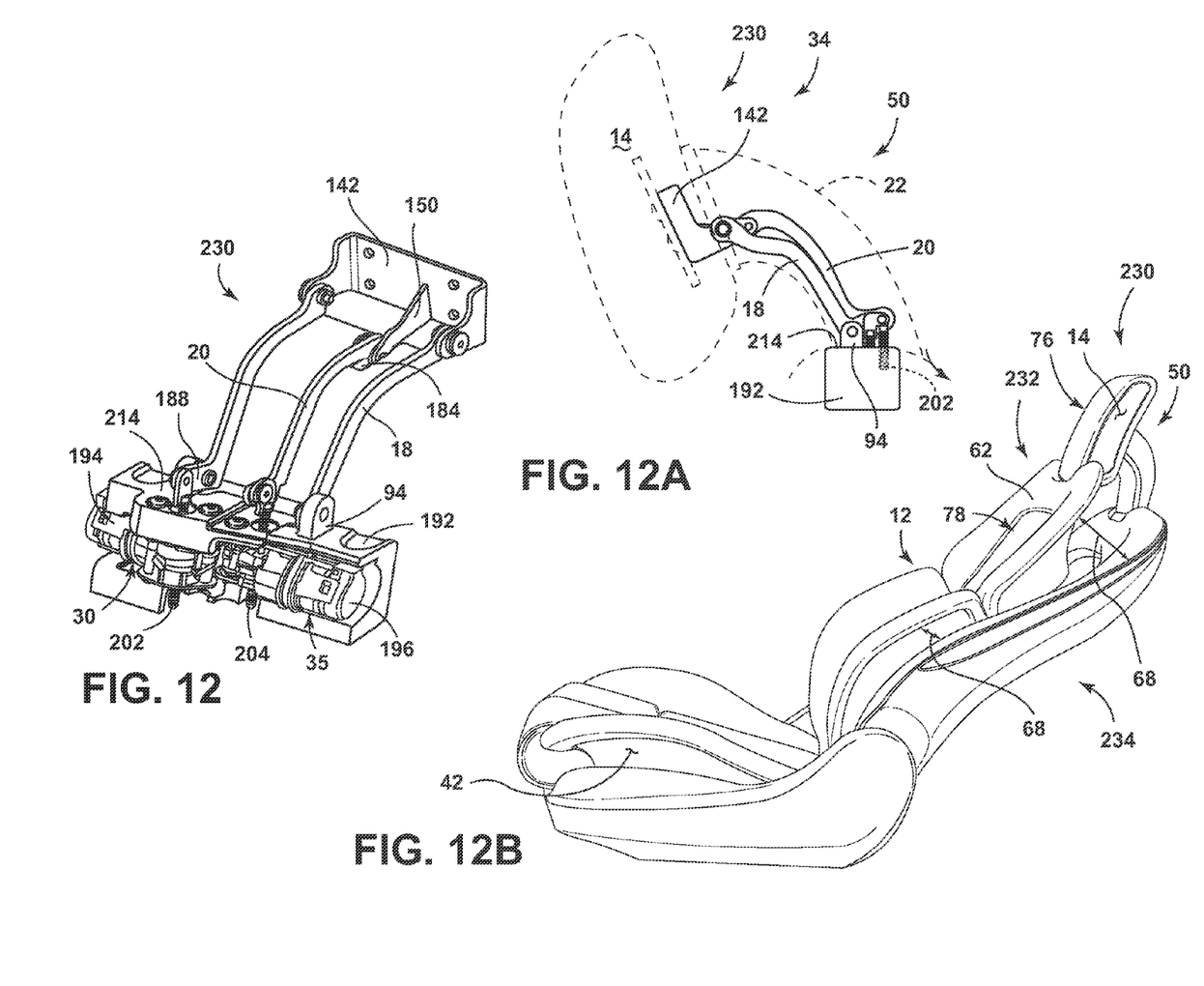
FIG. 12 is a is a rear, top perspective view of the support structure and the motorized actuation assembly, having the primary member linearly translated further upward from FIG. 11 by the first actuator.
FIG. 12A is a side elevational view of the headrest assembly, as shown in FIG. 12, having the headrest and the trim piece shown in dashed lines with the headrest positioned at a second forward position.
FIG. 12B is a side elevational view of the vehicle seating assembly, having the seatback in a second reclined position, the headrest in the second forward position at an upward angle.

As shown in FIGS. 12-12B, the headrest 14 is moved further forward in the forward position 34, moving the headrest assembly 50 to a second forward position 230. The first motor 194 further translates the first linear drive 202 upward to pivot the primary member 18 forward. As a result, the cam position 188 urges the primary member 18 to rotate forward in synchronous movement with the secondary member 20 adjusting the headrest 14 angle. The upper back support 62 also continues to simultaneously pivot forward to a second deployed position 232 where the lower edge of the headrest 14 abuts the upper edge of the upper back support 62, aligning the head support surface 76 with the back support surface 78. As shown, the headrest 14 and the upper back support 62 move to the second forward position 230 and the second deployed position 232 and a second reclined position 234, respectively, upon pivoting the seatback 12 to the second reclined position 234. It is contemplated that the headrest assembly 50 may adjustably reverse from second forward position 230 to first forward position 224 and to the vertical position 212, moving the headrest 14 from the forward position 34 to the rearward position 32 by reversing the steps described above. It is also contemplated that the headrest 14 may adjustably move between the forward position 34 and the rearward position 32 independently of seatback 12 and/or the upper back support 62.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle seating assembly comprising:
    a seatback;
    a headrest;
    a support structure extending between the headrest and the seatback, including:
        a primary member pivotally coupled with the headrest and the seatback;
        a secondary member having an upper end and a lower end, wherein the upper end is pivotally coupled with the headrest about a lateral axis spaced from the primary member; and
        a trim piece enclosing the primary and secondary members;
    a first actuator coupled between the primary member and the seatback for rotating the headrest between a rearward position and a forward position; and
    a second actuator coupled between the lower end of the secondary member and the seatback for moving the headrest between a first angle and a second angle.

2. The vehicle seating assembly of claim 1, wherein the seatback is pivotally coupled with a seat and movable between an upright position and a reclined position, and wherein the headrest automatically moves to the forward position when the seatback moves from the upright position to the reclined position.

3. The vehicle seating assembly of claim 1, wherein a bottom end of the primary member is pivotally coupled with the seatback and includes a cam portion extending from the bottom end to couple with the first actuator.

4. The vehicle seating assembly of claim 1, further comprising:
    an upper back support pivotally coupled to an intermediate portion of the seatback and movable between a rear position and a deployed position; and
    an external peripheral gap between the upper back support and the seatback, wherein the gap expands when the upper back support moves from the rear position to the deployed position.

5. The vehicle seating assembly of claim 4, further comprising:
    an upper suspension component coupled between the upper back support and the seatback and including outwardly extending flex members operably coupled to the upper back support.

6. The vehicle seating assembly of claim 4, wherein an actuation device is operably coupled to the upper back support to move the upper back support between the rear and deployed positions, and wherein the upper back support in the deployed position is configured to abut the headrest in the forward position.

7. The vehicle seating assembly of claim 4, wherein the headrest includes a head support surface and the upper back support includes a back support surface, and wherein the second angle of the headrest aligns the head support surface with the back support surface with the upper back support in the deployed position.

8. A vehicle headrest assembly comprising:
a headrest;
a primary member coupled between the headrest and a seatback;
a first motor operably coupled with the primary member to rotate the primary member forward and adjust the headrest position;
a secondary member coupled with the headrest about an axis spaced from the primary member; and
a second motor operably coupled with the secondary member to linearly actuate the secondary member and adjust the headrest angle.

9. The vehicle headrest assembly of claim 8, further comprising:
an upper back support pivotally coupled to an intermediate portion of the seatback and movable between a rear position and a deployed position; wherein the first and second motors operate to adjust the headrest position and the headrest angle to substantially align with the upper back support in the rear and deployed positions.

10. The vehicle headrest assembly of claim 8, further comprising:
a cam portion extending from the primary member proximate the seatback, wherein the cam portion pivotally couples with a linear drive extending from the first motor.

11. The vehicle headrest assembly of claim 10, wherein the first motor moves the linear drive between a first position and a second position to rotate the primary member and adjust the headrest position between a rearward position and a forward position.

12. The vehicle headrest assembly of claim 8, wherein the second motor linearly actuates the secondary member to rotate the headrest about the primary member and adjust the headrest angle between a first angle and a second angle.

13. The vehicle headrest assembly of claim 12, wherein the secondary motor is configured to move the headrest angle between the first and second angle automatically when the seatback moves from an upright position to a reclined position.

14. The vehicle headrest assembly of claim 8, wherein the primary member includes a first edge portion, a second edge portion, and a central body extending therebetween, wherein the first edge portion and the second edge portion are independently pivotally coupled between the headrest and a seatback.

15. The vehicle headrest assembly of claim 14, wherein the secondary member couples with the headrest between the first and second edge portions of the primary member, and wherein the central body includes a notch proximate the headrest for the secondary member to reside.

16. A vehicle headrest assembly comprising:
a headrest having front and rear surfaces;
an upper seatback having first and second actuators;
a primary member pivotally coupled between the headrest and the first actuator, and movable to adjust a position of the headrest; and
a secondary member pivotally coupled between the headrest and the second actuator, and movable to adjust an angle of the headrest, the primary and secondary members being pivotally coupled with the rear surface of the headrest.

17. A vehicle headrest assembly of claim 16, wherein a first lateral axis between the primary member and the headrest is spaced from a second lateral axis between the secondary member and the headrest.

18. A vehicle headrest assembly of claim 16, wherein the primary member has a lower end pivotally coupled with the seatback and a cam portion extending from the lower end and pivotally coupled with the first actuator.

19. A vehicle headrest assembly of claim 18, wherein the secondary member has a bottom end pivotally coupled with the second actuator, and wherein the second actuator moves the secondary member to rotate the headrest about an upper end of the primary member.

\* \* \* \* \*